(12) United States Patent
Bharadwaj

(10) Patent No.: US 11,398,980 B2
(45) Date of Patent: Jul. 26, 2022

(54) PACKET ROUTER WITH VIRTUAL CHANNEL HOP BUFFER CONTROL

(71) Applicant: Advanced Micro Devices, Inc., Santa Clara, CA (US)

(72) Inventor: Vedula Venkata Srikant Bharadwaj, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 129 days.

(21) Appl. No.: 16/687,996

(22) Filed: Nov. 19, 2019

(65) Prior Publication Data

US 2021/0152469 A1    May 20, 2021

(51) Int. Cl.
*H04L 45/586* (2022.01)
*H04L 45/00* (2022.01)
*H04L 45/12* (2022.01)
*H04L 45/741* (2022.01)

(52) U.S. Cl.
CPC ......... *H04L 45/586* (2013.01); *H04L 45/12* (2013.01); *H04L 45/566* (2013.01); *H04L 45/741* (2013.01)

(58) Field of Classification Search
CPC ..... H04L 45/586; H04L 45/12; H04L 45/566; H04L 45/741; H04L 45/127; H04L 49/109; H04L 49/254; H04L 49/253
See application file for complete search history.

(56) References Cited

U.S. PATENT DOCUMENTS

| | | | |
|---|---|---|---|
| 9,185,026 B2 | 11/2015 | Kumar | |
| 9,294,402 B2 | 3/2016 | Yamaguchi | |
| 9,306,844 B2 | 4/2016 | Locatelli | |
| 9,311,269 B2 | 4/2016 | Davis | |
| 9,479,456 B2 | 10/2016 | Hutton | |
| 9,507,599 B2 | 11/2016 | Muff | |
| 9,548,945 B2 | 1/2017 | Tran | |
| 9,582,251 B2 | 2/2017 | Pudiyapura | |
| 9,652,239 B2 | 5/2017 | Muff | |
| 9,652,425 B2 | 5/2017 | Chen | |
| 9,674,114 B2 | 6/2017 | Park | |
| 9,699,096 B2 | 7/2017 | Satpathy | |
| 9,705,827 B2 * | 7/2017 | Aybay | H04L 49/505 |
| 9,729,439 B2 | 8/2017 | MeLampy | |
| 9,762,485 B2 | 9/2017 | Kaplan | |
| 9,787,571 B2 | 10/2017 | De | |
| 9,858,242 B2 | 1/2018 | Palmer | |
| 9,860,197 B2 | 1/2018 | Kumar | |
| 9,864,728 B2 | 1/2018 | Norige | |

(Continued)

*Primary Examiner* — Chi H Pham
*Assistant Examiner* — Raul Rivas

(57) ABSTRACT

An integrated circuit includes a network on chip (NOC) that includes a plurality of processing elements and a plurality of NOC nodes, interconnected to the plurality of processing elements. The integrated circuit includes logic that is configured to: increment by one, a virtual channel identifier to produce an incremented destination VC identifier, the virtual channel (VC) identifier associated with at least portion of a packet stored in at least one virtual channel buffer; determine that a destination virtual channel buffer corresponding to the incremented destination VC identifier in a destination NOC node in the NOC is available to store the portion of the packet; and in response to the determination, send the portion of the packet and the incremented destination VC identifier to the destination NOC node.

11 Claims, 7 Drawing Sheets

(56) References Cited

U.S. PATENT DOCUMENTS

| | | |
|---|---|---|
| 9,866,476 B2 | 1/2018 | Anders |
| 9,870,204 B2 | 1/2018 | Pudiyapura |
| 10,142,258 B2 | 11/2018 | Sadowski et al. |
| 2016/0028633 A1 | 1/2016 | Durand |
| 2017/0048166 A1 | 2/2017 | Kodi |
| 2017/0063609 A1 | 3/2017 | Philip |
| 2017/0063625 A1* | 3/2017 | Philip .................. H04L 45/302 |
| 2017/0063626 A1 | 3/2017 | Norige |
| 2017/0099236 A1 | 4/2017 | Ancajas |
| 2017/0118139 A1 | 4/2017 | Bandic |
| 2017/0147528 A1 | 5/2017 | Sun |
| 2017/0230253 A1 | 8/2017 | Chopra |
| 2017/0272381 A1 | 9/2017 | Li |
| 2017/0289057 A1* | 10/2017 | Jiang .................... H04L 47/527 |

* cited by examiner

PACKET ROUTER WITH VIRTUAL CHANNEL HOP BUFFER CONTROL

GOVERNMENT LICENSE RIGHTS

This invention was made with Government support under PathForward Project with Lawrence Livermore National Security (Prime Contract No. DE-AC52-07NA27344, Subcontract No. B620717) awarded by the Department of Energy (DOE). The Government has certain rights in this invention.

BACKGROUND OF THE DISCLOSURE

Multiprocessor system on chip (MPSOC) and chip multiprocessor (CMP) infrastructures use bus structures for on-chip communication. However, traditional bus-based communication schemes lack scalability and predictability and are not capable of keeping up with increasing demands of future system on chips (SOCs). To meet the challenges of next-generation system designs, a network on chip (NOC) infrastructure, which is structured and scalable, has been proposed.

A conventional NOC infrastructure includes multiple interconnects, each including a processing element (PE), also referred to as a compute unit (CU), a homogeneous node, and a network interface (NI). The NI at the homogeneous node transforms data packet(s) from its original format generated from the CU into NOC fixed-length flow-control digits (flits) suitable for transmission in the NOC. The NOC flits associated with a data packet(s) include a header (or head) flit, a tail flit, and a number of body flits in between or it could be a single flit as well. The NOC flits are routed from a source node of one interconnect towards a target node of another interconnect, in a hop-by-hop manner. For example, when a source CU sends a data packet(s) to a target CU, or any other suitable agent in the NOC, the source CU first sends the data packet(s) to the NI associated with the source CU which transforms the data packet(s) into NOC flits. The NOC flits are transferred to a source node associated with the source CU, which subsequently routes the NOC flits to a target node of another interconnect associated with the target CU. The NOC flits travel in a hop-by-hop manner via links, which couple all the homogeneous nodes together within the NOC, from the source homogeneous node to any intervening homogeneous nodes between the source and target homogeneous nodes, until the NOC flits reach the target node. Upon receiving the NOC flits, the target node converts the NOC flits to the data packet(s) of the original format generated from the source CU, and the converted data packet(s) are sent to the target CU.

When at least one CU of the NOC is executing an application, the CU generates data packet(s) that include processed data as a result of executing the application. For example, if the CU is executing an image rendering application, the CU may generate data packet(s) that include a rendered image. When data packet(s) including such processed data flows within the NOC in the form of NOC flits, the NOC may experience heavy data traffic. One of ordinary skill in the art will recognize that the more hops the flits take to reach its intended destination, and the more CUs there are that generate additional data packet(s) for transfer, the NOC will experience even heavier data traffic and more power dissipation.

In a conventional two-dimensional NOC infrastructure, a node has five input ports and five output ports corresponding to the north, south, east, and west directions, as well as its associated CU. Each port is coupled to another port on the neighboring node via a set of physical interconnect wires or channels. The node's function is to route NOC flits received from each input port to an appropriate output port and then toward a target or destination node. To realize this function, the node is equipped with an input buffer for each input port, a crossbar switch to direct NOC flit traffic to the desired output port, and necessary control logic to route the NOC flits. The node may include a plurality of input queues to receive NOC flits from neighboring nodes. Each input queue includes a plurality of virtual channel buffers and a virtual channel buffer allocator to allocate virtual channel buffers to store incoming flits. The node may also include a local input queue to receive NOC flits from its associated CU. An arbiter and router serve as control logic to route the NOC flits from any of the aforementioned queues to the target node. For each NOC flit, the corresponding head flit specifies its intended target node, and after examining the head flit, the arbiter and router determine which output direction to route all the subsequent (body and tail) flits associated with the NOC flit according to routing algorithms as known in the art. Specifically, the arbiter and router communicates with a crossbar switch, which directs NOC flit traffic to the desired output port for transmission of NOC flits to other nodes of the NOC.

Routing solutions are known to include limiting router direction to, for example, not allow at least one turn to occur. For example, all nodes may be limited, so they cannot go in an eastern direction so that no directional loop is formed resulting in potential deadlocks. However, not allowing routers to route in a certain direction such as an x-y or a y-x direction can degrade network performance.

Existing buffer organizations for each input buffer for each input port, organizes a pool of virtual channel buffers for each input port. The buffers are generally split into queues called virtual channels for each input port to avoid head of line blocking. Each virtual channel can store flits from certain packets. The virtual channels are then arbitrated to select a virtual channel that is allowed to go to the next router (next node). Such systems are then combined with restricted routing like x-y direction, y-x direction, turn models, escape virtual channels, to avoid deadlocks leading to degradation and performance. Improving the quality-of-service typically involves using probabilistic arbitration, age-based arbitration, and other techniques. Reinforced learning-based arbitration has also been proposed to improve system performance. However, arbitration within routers for link traversals from virtual channel buffers result in a non-uniform fairness quotient for shared resources. Such prior systems employ a fully-associative virtual channel-based buffer organization resulting in deadlocks occurring in a system. This however can create many problems including, for example, inequality of service problem where virtual channel allocation with a round robin arbitration causes different computing units to experience different service times because of unfair arbitration. Deadlocks can occur because loops can be formed in networks because of filling of the virtual channels. For virtual channel arbitration, typically arbitration of virtual channels in multi-ported routers involve two steps, namely input virtual channel arbitration and switch allocation. Bad arbitrations can lead to non-optimal performance. Accordingly, a need exists for an improved packet routing system and method.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

Figure 1:
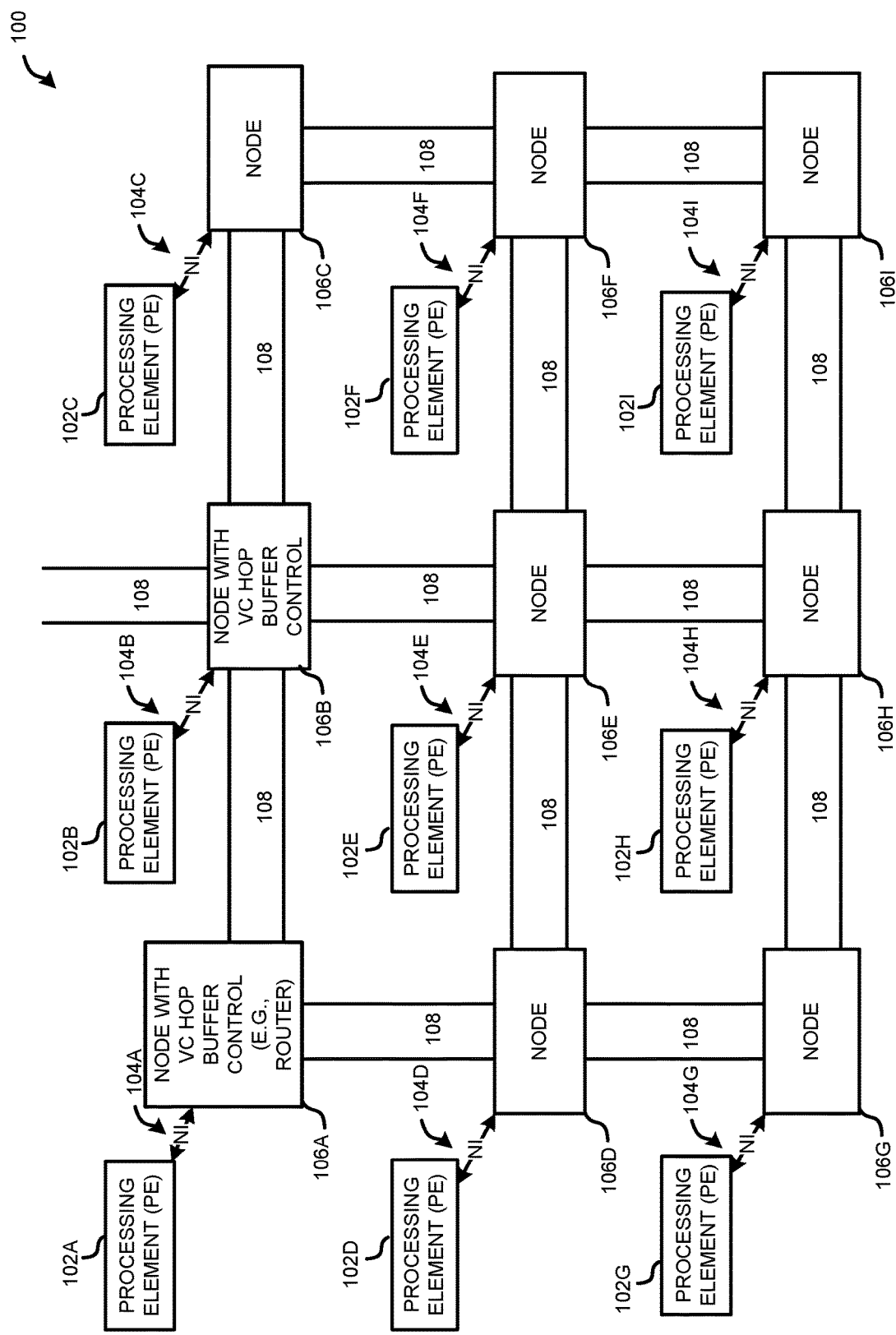
FIG. 1 is a block diagram illustrating an example of an integrated circuit having an NOC infrastructure employing a plurality of NOC nodes with virtual channel hop buffer control in accordance with one embodiment of the disclosure.

Briefly, in one example, NOC nodes or other types of packet routers employ a new organization for virtual channel (VC) buffers. In some implementations, this organization groups VC buffers into sets corresponding to a number of hops a flit traveled rather than having a fully associative pool. Each arriving packet is restricted to only go into a certain virtual channel buffer, or set of virtual buffers, in a destination node. Allocating virtual channels is based on the distance of the original sender from any node. In some implementations, this involves calculating the number of hops taken by any flit to reach a certain node. Thus, at each hop, any flit is allocated to a virtual channel buffer that caters to the number of hops that have been taken by the flit to reach that node. This helps in the quality of service as flits are arbitrated over the distance they have traversed compared to using virtual channels they were allocated in fairness type allocation strategies. Such a technique also can help avoid deadlocks in the system because the technique implicitly creates a dateline when following minimal routing paths. The implicit dateline does not allow a loop to be formed. This is because the virtual channel ID is always increased by one until the flit reaches a point where the maximum number of hops are possible in a system. Such a technique can also help with solving arbitration problems and reduce a two-step arbitration required by conventional allocation techniques (an input virtual channel arbitration and a switch allocation).

According to some embodiments, a method carried out by a first network routing node includes storing at least a portion of a packet, such as a flit or entire packet, that is destined for a destination network node, the portion of the packet having a virtual channel (VC) identifier associated therewith, and incrementing the VC identifier by one, to produce an incremented destination VC identifier. In certain embodiments, the method includes determining that a destination virtual channel buffer corresponding to the incremented destination VC identifier in the destination network node is available to store the portion of the packet and in response to determining that the destination virtual channel buffer corresponding to the incremented destination VC identifier is available to store the at portion of the packet, sending the portion of the packet and the incremented destination VC identifier to the destination node.

In some embodiments the method includes determining that the destination virtual channel buffer in the destination node is available to receive the portion of the packet by receiving notification data from the destination network node that the destination virtual channel buffer corresponding to the incremented destination VC identifier in the destination network node is available to store the portion of the packet. In certain embodiments, the method further includes receiving notification data from the destination network node that the destination virtual channel buffer corresponding to the incremented destination VC identifier in the destination network node is not available to store the portion of the packet and waiting to send the portion of the packet and the incremented destination VC identifier to the destination node until the destination virtual channel buffer corresponding to the incremented destination VC identifier in the destination network node is available. In some embodiments, the method performs a virtual channel ID increment by one operation for each directional input queue of the first network routing node.

In certain embodiments, a method in a network on chip (NOC) includes: storing, by a source node in the NOC, at least a portion of a packet that is destined for a first destination network node in the NOC, the portion of the packet having a virtual channel (VC) identifier associated therewith, producing, by the source node in the NOC, a first incremented destination VC identifier by incrementing the virtual channel identifier by one, the VC identifier associated with the portion of the packet, determining, by the source node in the NOC, that a first destination virtual channel buffer corresponding to the incremented destination VC identifier in the destination network node is available to store the portion of the packet, in response to the determination, sending by the source node in the NOC, the portion of the packet and the incremented destination VC identifier to the destination node, storing, by the destination node in the NOC, the portion of the packet in the destination virtual channel buffer corresponding to the incremented destination VC identifier, producing, by the first destination node in the NOC, a second incremented destination VC identifier by incrementing the virtual channel identifier by one, the incremented destination VC identifier associated with the portion of the packet, determining, by the first destination network node in the NOC, that a second destination virtual channel buffer corresponding to the incremented destination VC identifier in a second destination network node is available to store the portion of the packet, and in response to the determination by the first destination network node, sending by the first destination network node in the NOC, the portion of the packet and the second incremented destination VC identifier to the second destination network node.

In one example, the method includes determining that the first destination virtual channel buffer in the first destination node is available to store the portion of the packet by storing notification data from the first destination network node that the first destination virtual channel buffer corresponding to the incremented destination VC identifier in the first destination network node is available to store the portion of the packet. In certain embodiments, the method further includes storing notification data from the first destination network node that the first destination virtual channel buffer corresponding to the incremented destination VC identifier in the first destination network node is not available to store the portion of the packet and waiting to send the portion of a packet and the incremented destination VC identifier to the first destination node until the first destination virtual channel buffer corresponding to the incremented destination VC identifier in the first destination network node is available. In certain embodiments, the method includes performing the storing, the incrementing, the determining and the sending for each directional input queue of the source node.

According to some embodiments, an integrated circuit includes a network on chip (NOC) that includes a plurality of processing elements, a plurality of NOC nodes, interconnected to the plurality of processing elements, each of the plurality of NOC nodes including a plurality of directional input queues and each directional input queue includes a plurality of corresponding virtual channel buffers. The integrated circuit includes logic that increments a virtual channel (VC) identifier associated with at least portion of a packet stored in at least one virtual channel buffer by one to produce an incremented destination VC identifier and determines that a destination virtual channel buffer corresponding to the incremented destination VC identifier in a destination NOC node in the NOC is available to store the portion of the packet, and in response to the determination, sends the portion of the packet and the incremented destination VC identifier to the destination NOC node.

In certain embodiments, the logic determines that the destination virtual channel buffer in the destination node is available to store the portion of a packet by receiving notification data from the destination network node that the destination virtual channel buffer corresponding to the incremented destination VC identifier in the destination network node is available to store the portion of the packet.

In some embodiments, the logic receives notification data from the destination network node that the destination virtual channel buffer corresponding to the incremented destination VC identifier in the destination network node is not available to store the portion of the packet and to wait to send the portion of the packet and the incremented destination VC identifier to the destination node until the destination virtual channel buffer corresponding to the incremented destination VC identifier in the destination network node is available. In certain embodiments, the logic performs virtual channel ID increment by one operation for each of the plurality of directional input queues.

In some embodiments, the destination NOC node includes logic to store the portion of the packet and the destination virtual buffer corresponding to the incremented destination VC identifier, determine whether the destination NOC node is a final destination for the portion of the packet, and when the destination NOC node is not the final destination perform the incrementing, the determining and the sending for a next destination NOC node in a flow path for the portion of the packet.

According to certain embodiments, a network routing node, such as a packet routing node, includes logic to store at least a portion of a packet that is destined for a destination network node, the portion of the packet having a virtual channel (VC) identifier associated therewith and increment the virtual channel identifier by one to produce an incremented destination VC identifier, the VC identifier associated with the portion of the packet. In some embodiments, the network routing node determines that a destination virtual channel buffer corresponding to the incremented destination VC identifier in the destination network node is available to store the portion of the packet and in response to the determination, sends the portion of the packet and the incremented destination VC identifier to the destination network node.

In certain embodiments, the network routing node includes logic to determine that a destination virtual channel buffer corresponding to the incremented destination VC identifier in the destination network node is available to store the portion of the packet in response to receiving notification data from the destination network node that the destination virtual channel buffer corresponding to the incremented destination VC identifier in the destination network node is available to store the portion of the packet.

In some embodiments, the network routing node includes logic to receive notification data from the destination network node that the destination virtual channel buffer corresponding to the incremented destination VC identifier in the destination network node is not available to store the portion of the packet and to wait to send the portion of the packet and the incremented destination VC identifier to the destination node until the destination virtual channel buffer corresponding to the incremented destination VC identifier in the destination network node is available.

In certain embodiments, the network routing node includes logic that includes a plurality of directional input queues and wherein the logic performs the virtual channel ID increment by one operation for each directional input queue of the network routing node.

FIG. 1 illustrates a block diagram of an example of a routing network 100. In one example, the routing network 100 is on an integrated circuit. In another example, the routing network is in a non-integrated circuit architecture, such as an intranet or internet routing network. The FIG. 1 example will be described as an integrated circuit having an NOC infrastructure employing a plurality of NOC nodes. However, the operations described herein may be employed to any suitable data packet network architecture. The NOC infrastructure includes multiple interconnects, each including a processing element such as 102A-102I, an NOC node, such as 106A-106I, a network interface (NI), such as 104A-104I that are interconnected through interconnects shown as 108 to other processing units. Although only nine interconnects are shown, one of ordinary skill in the art will recognize that NOC infrastructures may have any suitable number of interconnects. The NOC infrastructure is depicted as a two-dimensional structure for ease of illustration. However, in some embodiments, the NOC infrastructure are three-dimensional.

In one example, each network interface transforms data packet(s) from its original format generated from the processing element into NOC fixed-length flow-control digits (flits) suitable for transmission in the NOC. The NOC flits associated with data packets include a header flit, a tail flit, and a number of body flits in between. The NOC flits are routed from a source NOC node of one interconnect toward a target NOC node of another interconnect in a hop-by-hop manner. For example, when a source processing element, such as processing element 102B, sends packets to a target PE such as PE 102F, the source PE sends the data packets to the NI associated with the source PE, such as NI 104B which transforms the data packets into NOC flits. The NOC flits are transferred to a source NOC node associated with the source PE, such as NOC node 106B, which subsequently routes the NOC flits to a target NOC node of another interconnect associated with the target PE, such as NOC node 106F. The NOC flits travel in a hop-by-hop manner via the interconnects 108 which couple all of the NOC nodes together within the NOC, from the source NOC node to any intervening nodes between the source and target NOC nodes, such as NOC node 106C, until the NOC flits reach a final destination NOC node. Each sequential transmission in a flow path between nodes is considered a hop. Upon receiving the NOC flits, the final destination NOC converts the NOC flits to the data packets of the original format generated from the source PE and the converted data packets are sent to the final destination PE. As such, each node serves both as a source node when it is sending flits and serves as a destination node when the node is receiving flits from a neighboring node.

In one embodiment, each of the nodes has virtual channel hop buffer control logic therein. However, other embodiments, conventional nodes are mixed with nodes that have virtual channel hop buffer control as described herein. In certain embodiments, the virtual channel hop buffer control logic receives a portion of a packet, such as a flit, that is destined for a destination network node. Each flit has a virtual channel (VC) identifier (ID) assigned to it by a node serving as the source node. A virtual channel identifier identifies a virtual channel within the source node. In certain examples, the virtual channel hop buffer control logic causes a next destination network node in the flow path of the flit to only store the flit in a destination virtual channel buffer corresponding to a number of hops that the flit has traveled since originating on the routing path. In certain examples, the virtual channel hop buffer control logic restricts the sending of a flit until an incremental buffer in the destination node is available, as such a source node waits until an incremental virtual channel buffer in an immediate destination node is available.

Figure 2:
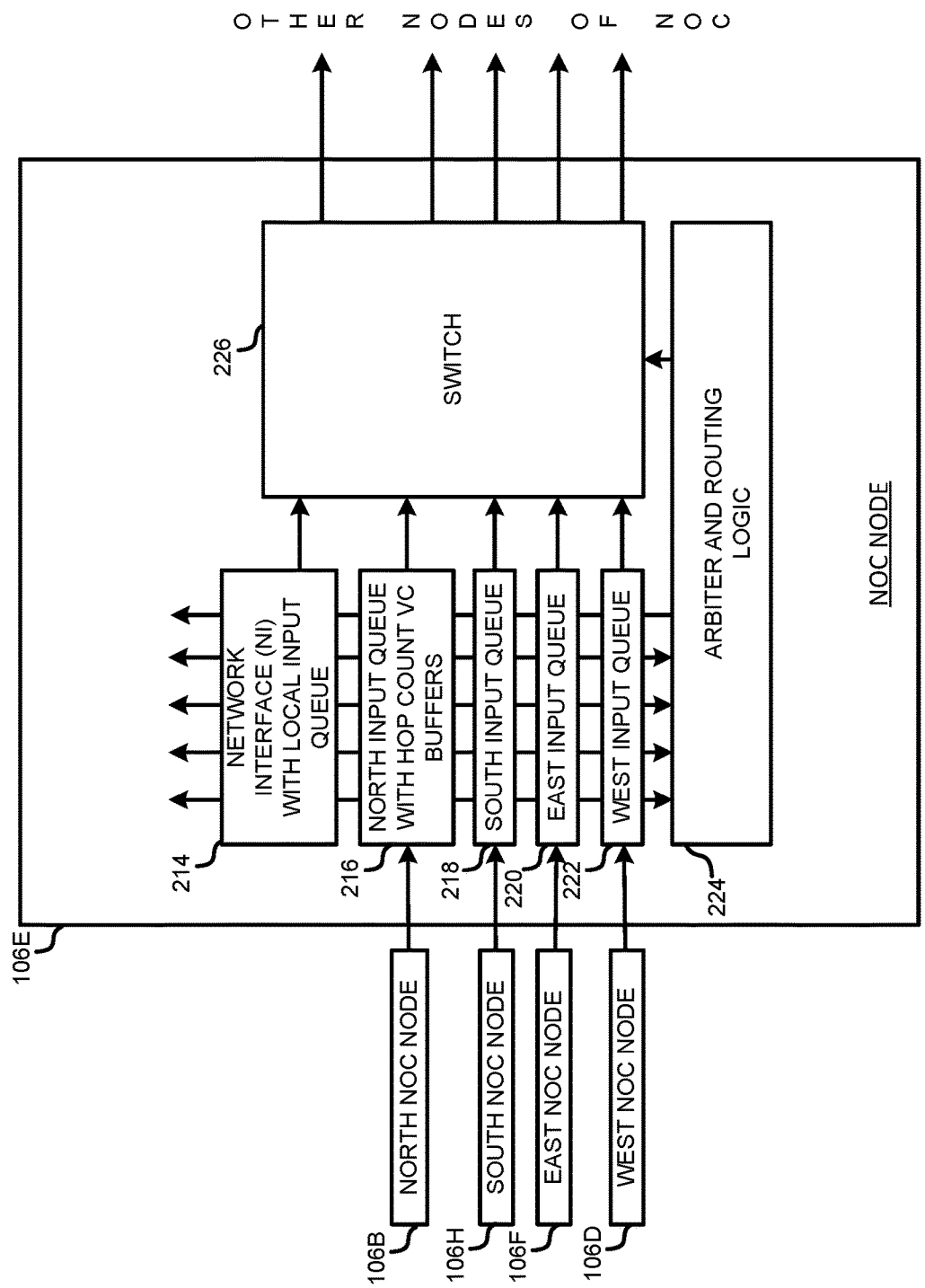
FIG. 2 is a block diagram illustrating an example of a network routing node in accordance with one embodiment of the disclosure.

FIG. 2 is a block diagram illustrating one example of a network routing node, in this example, NOC node 106E of FIG. 1. NOC node 106E includes a network interface 214 with suitable local input queues that store data from the local PE and a plurality of directional input queues. In this example, there is a north input queue 216, a south input queue 218, an east input queue 220 and a west input queue 222. The input queues receive flits from other nodes. The NOC node 106E also includes arbiter and routing logic 224 to arbitrate among the input queues and to route flits from the switch 226 to other intermediate nodes or final node in the system. In this example, each of the directional input queues include a set of virtual channel buffers wherein each virtual channel buffer stores a different flit hop level for incoming flits. Stated another way, each virtual channel is restricted to store the same hop count of flits that are being received. For example, there is a virtual channel buffer that stores flits that have undergone one hop, another virtual channel buffer that stores flits that have undergone two hops, another virtual channel buffer that stores flits that have undergone three hops and so on. In one example, there are a same number of virtual channel buffers as there are nodes in the system. However, any suitable number may be employed as desired.

Figure 3:
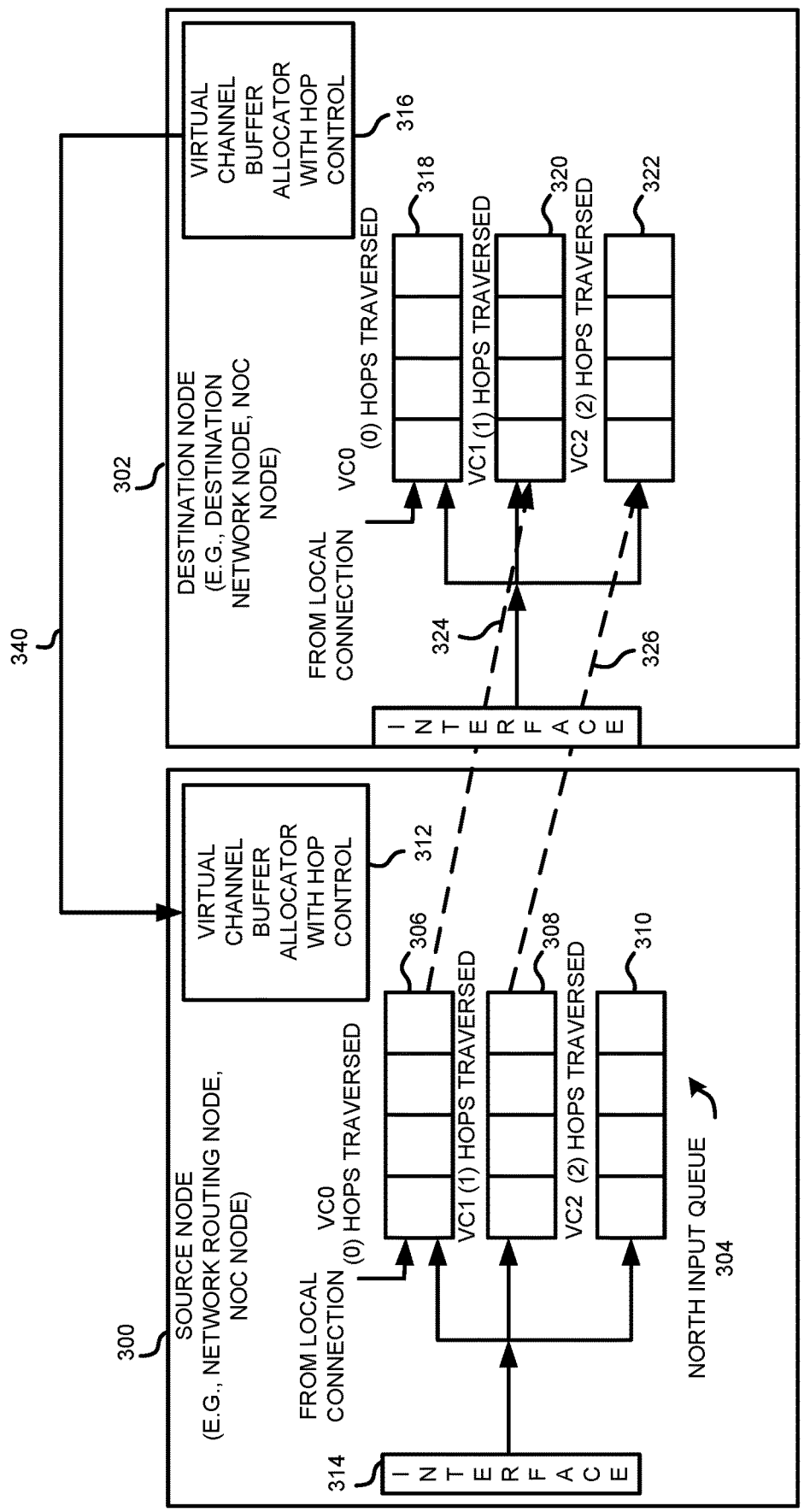
FIG. 3 is a block diagram illustrating one example of a plurality of network routing nodes in accordance with an embodiment of the disclosure.

FIG. 3 is a block diagram illustrating corresponding input queues from a source node 300 (e.g., NOC node 106B) and a destination network node 302 (e.g., NOC node 106E). In some implementations, the source node 300 is configured as a network routing node to route packets within a network such as an NOC or non-NOC network. In this example, the destination network node 302 is an intermediate destination node. It will be recognized that the intermediate destination node, in some implementations also serves as the final destination node. Each node will also be referred to as a router. In this example, the source node 300 is illustrated as a network routing node that includes a north input queue 304 that includes three virtual channel buffers 306, 308 and 310.

In this example, the north input queue 304 includes logic that serves as a virtual channel buffer allocator 312 and in particular, a virtual channel buffer allocator with hop control. The virtual channel buffer allocator 312 in this example allocates a zero-hop virtual channel buffer that only stores flits from the local PE shown as virtual channel buffer 306. The virtual channel buffer allocator 312 allocates another virtual channel buffer to only store flits that have undergone a single hop shown as virtual channel buffer 308 and another virtual channel buffer that only stores flits that have undergone two hops. In some examples, the number of virtual channel buffers equal the number of nodes in the system. The north input queue 304 also includes an interface 314 that interfaces with another queue from another routing node. In this example, the nodes 300 and 302 are NOC nodes that are interconnected to corresponding processing elements. Each of the NOC nodes includes the plurality of directional input queues and each input queue includes a plurality of corresponding virtual channel buffers. As such, the destination network node 302 also includes a virtual channel buffer allocator 316 with hop control that also allocates virtual channel buffers corresponding to a number of hops that a flit travels. In this example, there is a virtual channel buffer 318 that serves as zero-hop virtual channel buffer that only stores flits from the local PE since those flits have not undergone a hop in a routing path. Another virtual channel buffer 320 only stores flits that have undergone a single hop and virtual channel buffer 322 only stores flits that have undergone two hops.

Figure 4:
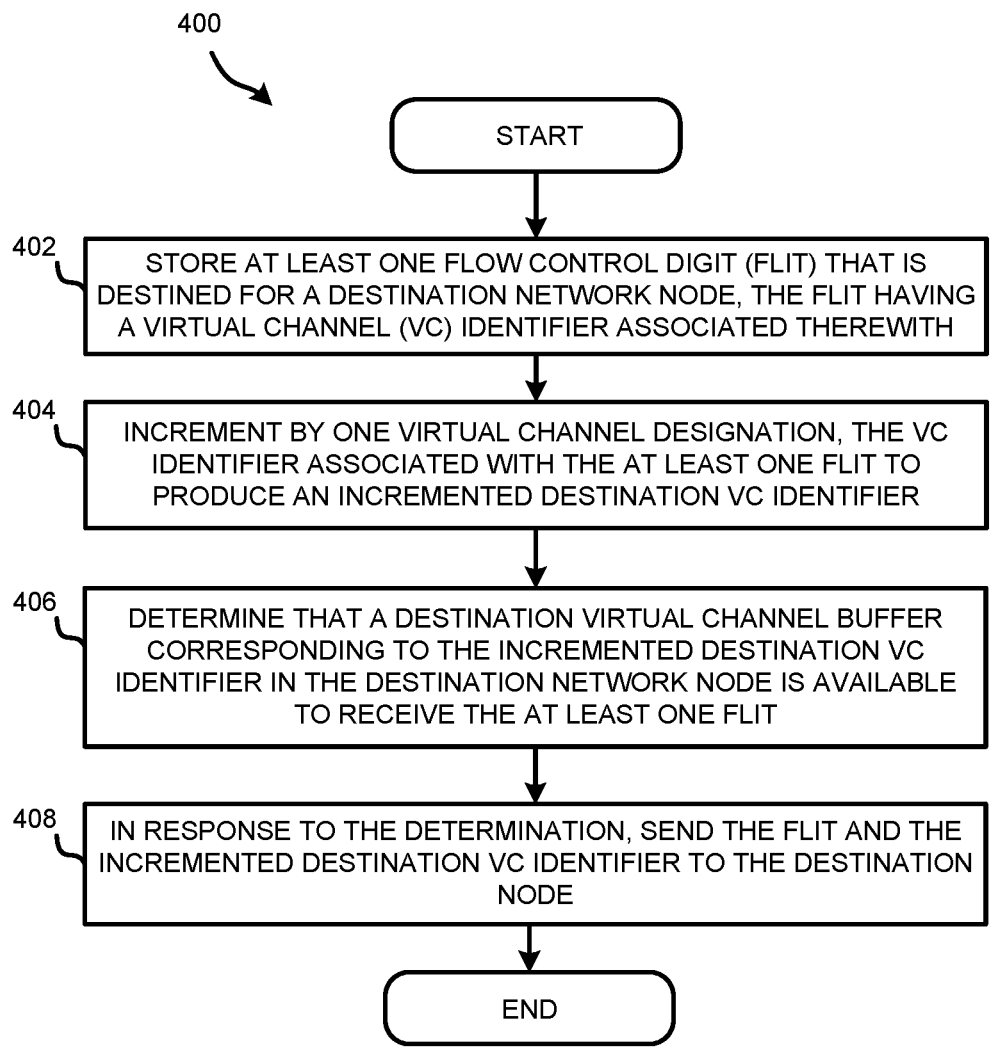
FIG. 4 is a flowchart illustrating one example of a method for routing at least a portion of the packet in accordance with one embodiment of the disclosure.

Referring also to FIG. 4, a method 400 of routing at least a portion of a packet which as used herein includes a flit, multiple flits or an entire packet or multiple packets, is illustrated. In one example, the method is performed by the virtual channel buffer allocator 312 with hop control when operating as part of a source node. It will be understood that the virtual channel buffer allocator 316 in some implementations also performs the same operations when destination network node 302 is operating as a source node. The virtual channel buffer allocator 312 with hop control is configured to be any suitable logic including one or more state machines, application specific integrated circuits, a programmed processor that executes executable instructions that are stored in memory that when executed, cause the processor to perform the operations stored herein, or any other suitable structure.

In some implementations, the method includes the virtual channel buffer allocator 312 storing at least one flow control digit that is destined for a network node such as a destination network node 302. The flit has a virtual channel identifier associated therewith. In this example, the flits stored in virtual channel buffer 306 have a virtual channel ID of zero (VCID_0), flits stored in virtual channel buffer 308 have a virtual channel ID of one (VCID_1) and the flits that are stored in the virtual channel buffer 310 have a virtual channel ID of two (VCID_2). This is shown in block 402. As shown in block 404, the VC identifier associated with the flit is incremented by one to produce an incremented destination VCID. In this example, the virtual channel identifier associated with the flit stored in virtual channel buffer 306 is incremented from virtual channel zero by a plus one so that the destination virtual channel ID for the flit stored in virtual channel buffer 306 becomes virtual channel ID one (from VCID_0 to VCID_1). Likewise, the virtual channel ID for flits stored in virtual channel one is incremented by one to have a virtual channel ID of virtual channel two. Therefore, the virtual channel buffer allocator 312 produces an incremented (i.e., by one) destination virtual channel identifier for the flits stored in each of the respective virtual channel buffers to reflect one additional hop for each flit. As shown by the dashed lines 324 and 326, the virtual channel buffer allocator 312 restricts the destination virtual channel buffer allocator 316 to store flits in an incremental virtual channel buffer from the source router. For example, the flits stored in virtual channel buffer 306 which corresponds to VCID_0 source to be stored in VCID_1 destination (incremented by one) in the destination router which in this example is virtual channel buffer 320. Likewise, flits stored in source node virtual channel buffer 308 VCID_1 source are restricted by the virtual channel buffer allocator 312 to only be stored by the virtual channel buffer allocator 316 into virtual channel buffer 322 corresponding to the VCID_2 destination (incremented by one).

As such, in some implementations, the destination network node 302 stores received flits only in incremented virtual channel buffers compared to the source channel buffers from which they came. As such, the number of hops is effectively tracked. For example, the flits that started off with zero hops in source node 300 were initially stored in virtual channel zero are stored in virtual channel one in the next router. As such, the flits stored in the virtual channel corresponding to one hop, namely virtual channel buffer 320, are known to have only been communicated once within the network.

As shown in block 406, the method includes determining that a destination virtual channel buffer corresponding to the incremented destination virtual channel ID in the destination network node is available to receive the at least one flit. In one example, the virtual channel buffer allocator 312 with hop control determines that the destination virtual channel buffer in the destination network node is available to receive the flit through the virtual channel buffer allocator 316 communicating availability of those virtual channel buffers that are available to receive flits. In one example, the virtual channel buffer allocator 312 receives notification data from the destination network node that the destination virtual channel buffer corresponding to the incremented destination virtual channel identifier, in the destination network node, is available to store the at least a portion of the packet. This is represented by communication 340. As shown in block 408, in response to the determination that the destination virtual channel is available, the flit and the incremented destination identifier are sent to the destination node.

If the virtual channel buffer is not available, the virtual channel buffer allocator 312 will not forward the flit to the destination router but instead waits until the destination router virtual channel buffer corresponding to the incremented virtual channel ID is available. In this manner, flits are only stored in virtual channel buffers that correspond to the number of hops that the flits have undergone.

For example, if the respective incremental virtual channel buffer in the destination router is not available, then the flit is not sent by the source router and the source router waits until notification that the appropriate virtual channel buffer in the destination router is available. In some implementations, notification data identifies a timeout period after which the flit is to be sent. In another implementation, the virtual channel buffer allocator receives notification data from the destination network node that the destination virtual channel buffer corresponding to the incremented destination virtual channel identifier in the destination node is not available to store the packet. The virtual channel buffer allocator 312 then waits to send the packet to the destination node until the destination virtual channel buffer corresponding to the incremented destination virtual channel identifier in the destination network node is available.

In one implementation, the virtual channel buffer allocator 312 increments the virtual channel ID by one for a given flit and sends the incremented virtual channel ID along with the flit to the destination node so the destination node stores the flit in the proper virtual channel buffer corresponding to the virtual channel ID that has been incremented. The operations are performed for each directional input queue of the source routing node as needed.

A network routing node, such as an internet router or any other suitable network routing node, in some implementations, perform the operations as described herein. As such, a network routing node in certain implementations includes logic that stores at least a portion of a packet such as a flit or a full packet or a plurality of packets that is destined for a destination network node. The packet has a virtual channel identifier associated therewith. The logic increments the virtual channel identifier by one to produce an incremented destination VC identifier, the VC identifier associated with the packet. The logic determines that a destination virtual channel buffer corresponding to the incremented destination VC identifier in the destination network node is available to store the packet. In response to the determination, the logic sends the packet and incremented destination VC identifier to the destination node. The destination network node stores the packet and the virtual channel buffer identified by the incremented destination VC identifier and serves as the source node for the packet going to the next node in the routing path. The logic of the source node in some implementations determines that a destination virtual channel buffer corresponding to the incremented destination VC identifier and the destination network node is available to store the packet, in response to receiving notification data from the destination network node indicating that the destination virtual channel buffer corresponding to the incremented destination VC identifier and the destination network node is available to store the packet. As used herein, a portion of a packet includes one or more flits, and/or one or more packets. Also, use of the word packet also includes a portion of a packet such as one or more flits. In certain implementations, the logic receives notification data from the destination network node that the destination virtual channel buffer corresponding to the incremented destination VC identifier in the destination network node is not available to store the packet. The logic waits to send the packet and the incremented destination VC identifier to the destination node until the destination virtual channel buffer corresponding to the incremented destination VC identifier in the destination network node is available. The logic performs the above operations for each directional input queue of the network routing node.

Figure 5:
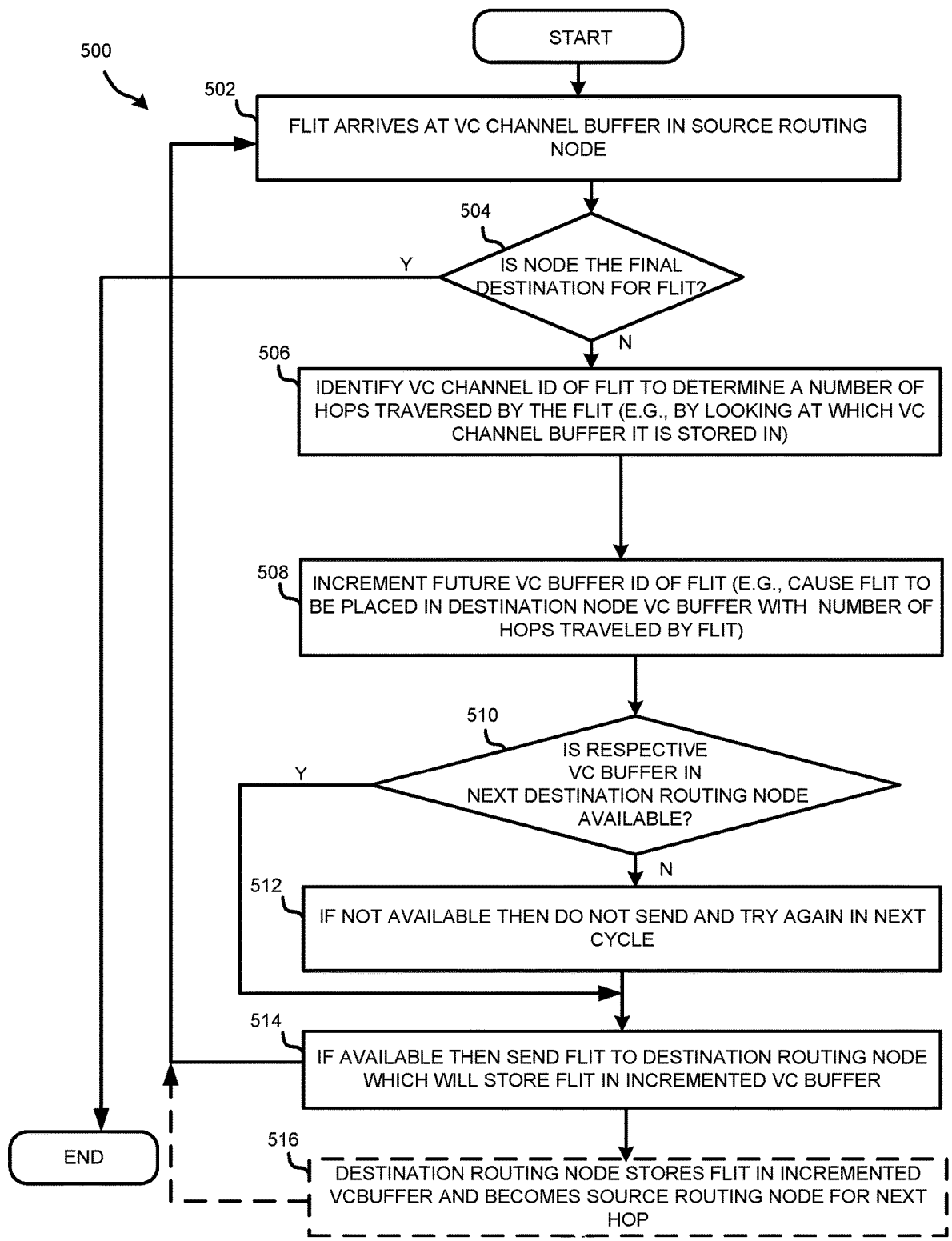
FIG. 5 is a flowchart illustrating one example of a method for routing at least a portion of the packet in accordance with one embodiment of the disclosure.

FIG. 5 is a flowchart illustrating a method 500 for providing virtual channel hop buffer control which in one example, is carried out by a network routing node such as an NOC node or any other suitable node serving as a source node. Block 502 illustrates that the source node receives a flit at a virtual channel buffer in the source routing node from a previous destination node or local PE. As shown in block 504, the method includes determining if the source node is the final destination for the flit. In some implementations, this is done, for example, by the logic examining the flit header information or other suitable routing information associated with the flit to determine if the current node is the last node in the routing path. If so, the method ends. However, if the source node is not the final destination node in the routing path, the method continues as shown in block 506 where the source node identifies the VC identifier of the flit to determine the number of hops traversed by the flit. For example, by logic (e.g., virtual channel buffer allocator 312) looking at the VC ID and hence the VC buffer that the flit is stored in, the logic knows how many hops the flit has undergone since each virtual channel buffer only stores flits having the same number of hops. As shown in block 508, the method includes incrementing the VC buffer ID to produce an incremented destination VC identifier. As such, the identifier is incremented by one. This causes the flit to be placed in a destination node VC buffer in an incremented virtual channel buffer thereby placing the flit in the virtual channel buffer corresponding to the number of hops traveled by the flit.

As shown in block 510, the logic in the source node determines if a respective VC buffer for the flit is available. For example, suitable flow control operations are used. In one example, the logic in the destination node updates its registers or the registers of the source node or communicates in any other fashion that a destination virtual channel buffer corresponding to the incremented destination virtual channel identifier is available in the destination routing node. In some implementations, this is done by taking current inventory of availability in various virtual channel buffers noting which virtual channel buffers are available and providing the information to the source node. If the desired respective VC buffer in the destination routing node is available, the method continues to block 514 and the source node sends the flit to the destination routing node with the incremented virtual channel identifier so that the destination node stores the flit in the appropriate VC buffer. As shown in block 516, if the destination node is an intermediate destination node, the destination node needs to forward packets to a subsequent destination node in the routing path, the destination routing node increments the VC buffer ID and becomes the source routing node for the next hop. Returning back to block 510, if the respective virtual channel buffer in a destination routing node is not available, then as shown in block 512, the source routing node waits until the destination virtual channel corresponding to the incremented destination virtual channel ID is available and tries the operation again to send the flit to the destination routing node for storage in the incremented VC buffer.

Figure 6:
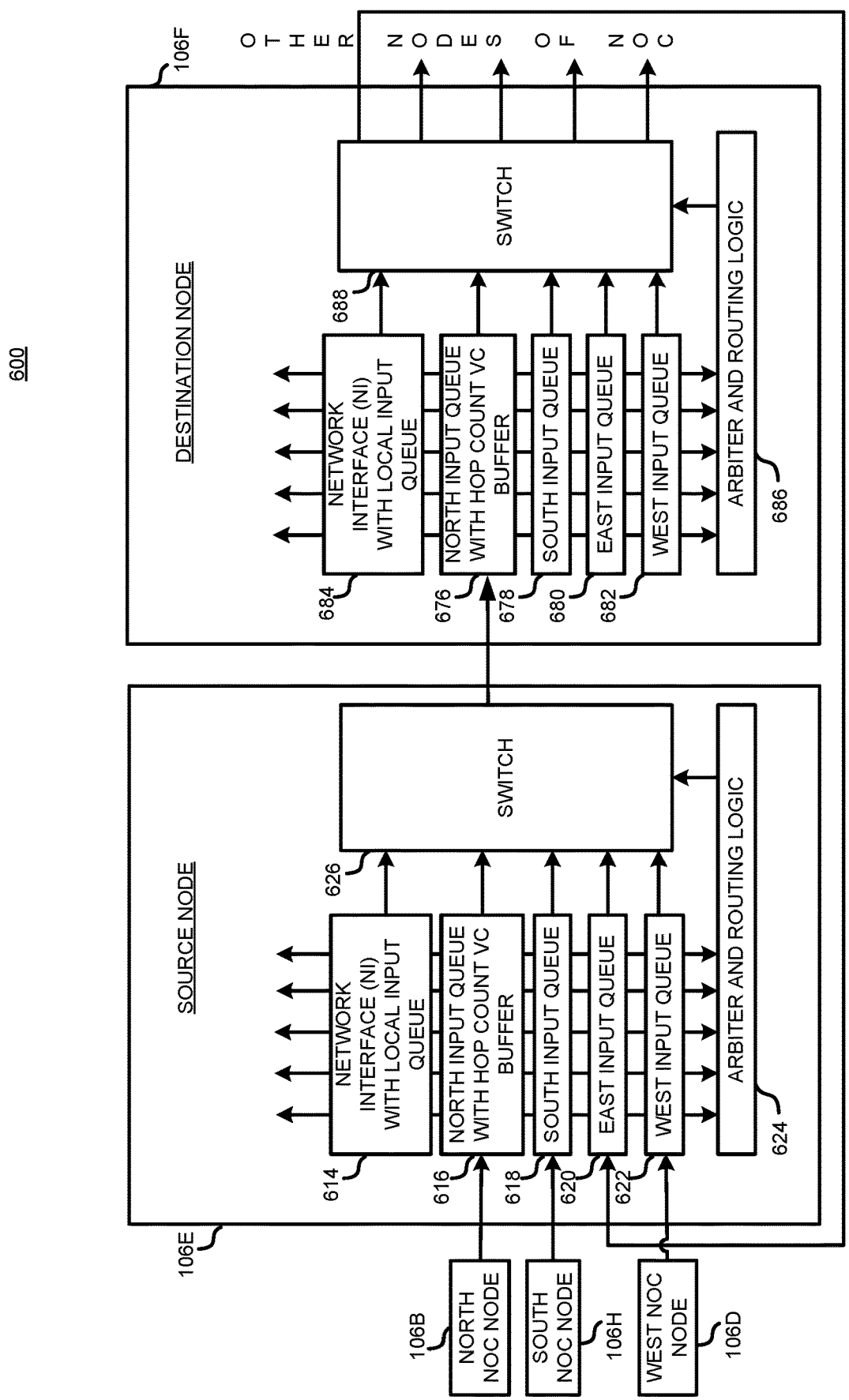
FIG. 6 is a block diagram illustrating one example of a plurality of network routing nodes in accordance with an embodiment of the disclosure.

FIG. 6 is a block diagram illustrating a plurality of network nodes operating as a source node and a destination node. In this example, the nodes are shown as being NOC nodes 106E and 106F. However, the nodes in some implementations are network routing nodes in any suitable architecture. In this example, the NOC is on an integrated circuit 600 and the circuit includes a network on chip that includes processing elements (not shown) and a plurality of NOC nodes 106E and 106F. The NOC nodes are interconnected to the plurality of processing elements (see, for example, FIG. 1). Each of the NOC nodes include a plurality of directional input queues shown in this example as 614-622 and 676-684. Each directional input queue includes corresponding virtual channel buffers (see, e.g., FIG. 4). As shown in this example, the north input queue 616 includes logic such as virtual channel buffer allocator 312 that causes the north input queue to be a queue with hop count virtual channel buffers. In some implementations, similar logic is also used for each input queue on both the source node and the destination node as previously described. The logic increments virtual channel identifier by one, a virtual channel identifier associated with at least a portion of a packet stored in a virtual channel buffer, to produce an incremented destination VC identifier. The logic determines that a destination virtual channel buffer corresponding to the incremented destination VC identifier and the destination NOC node and the NOC is available to store the portion of the packet and in response to the determination, sends the portion of the packet and the incremented destination VC identifier to the destination NOC node 106B. The destination NOC node 106B then stores the portion of the packet in the virtual channel buffer identified by the incremented destination VC identifier and becomes the source node for sending the portion of the packet to the next destination node. As shown, each node includes arbiter and routing logic 624 and 686 as well as switching logic 626 and 688 as known in the art.

Figure 7:
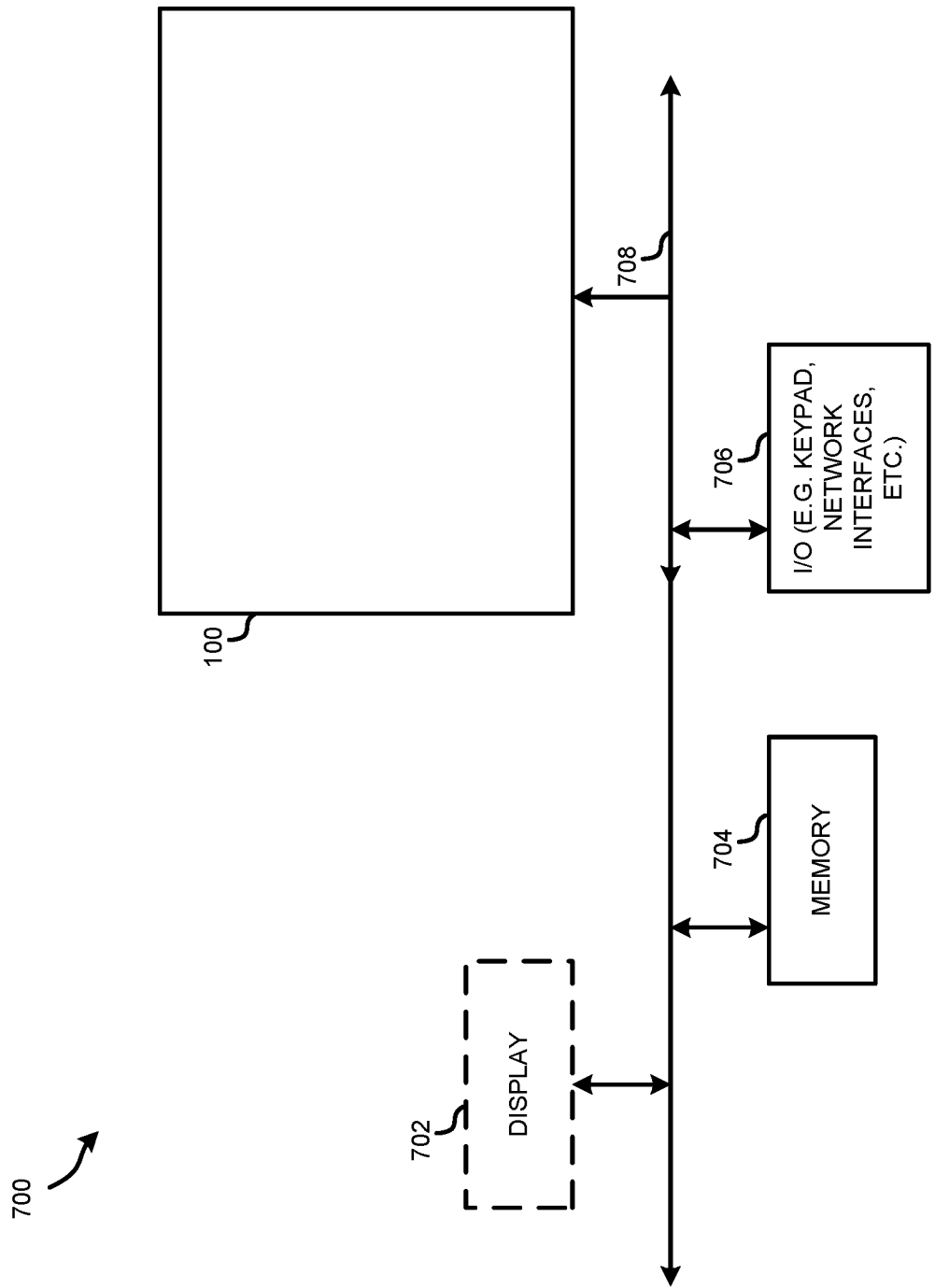
FIG. 7 is a block diagram illustrating an example of an apparatus having an integrated circuit having an NOC infrastructure employing a plurality of NOC nodes with virtual channel hop buffer control in accordance with an embodiment of the disclosure.

FIG. 7 is a block diagram illustrating an example of an apparatus having an integrated circuit having a network on chip (NOC) infrastructure employing a plurality of NOC nodes with virtual channel hop control. The NOC architecture of FIG. 1, in some embodiments, is implemented in a processor or integrated circuit, such as a CPU, GPU, general processor (e.g., APU or GPGPU), or any suitable combination thereof or any other suitable processor. The NOC architecture implemented in the processor or integrated circuit in some implementations are within a computing environment 700 that includes memory 704, I/O interface 706 (e.g. keypad, network interface, etc.), and optionally a display 702. The computing environment 700 may be a laptop computer, a desktop computer, a handheld device, HD television, a server, server system or any such suitable environment. Communication paths, such as bus 708, interconnecting the various components in FIG. 7 are implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

As set forth above, NOC nodes or other types of routers employ a new organization for virtual channel (VC) buffers. This organization groups VC buffers into sets corresponding to a number of hops a flit traveled rather than having a fully associative pool. Each arriving packet is restricted to only go into a certain virtual channel buffer in a destination node. Allocating virtual channels is based on the distance of the original sender from any node. In some implementations, this involves calculating the number of hops taken by any flit to reach a certain node. Thus, at each hop, any flit is allocated to a virtual channel buffer that caters to the number of hops that have been taken by the flit to reach that node. Among other technical benefits, this helps in the quality of service as flits are arbitrated over the distance they have traversed compared to using virtual channels they were allocated in fairness type allocation strategies. Such a technique also can help avoid deadlocks in the system because the technique implicitly creates a dateline when following minimal routing paths. The implicit dateline does not allow a loop to be formed. This is because the virtual channel ID is always increased by one until the flit reaches a point where the maximum number of hops are possible in a system. Such a technique can also help with solving arbitration problems and reduce a two-step arbitration required by conventional allocation techniques (an input virtual channel arbitration and a switch allocation).

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner including in parallel if desired. It is therefore contemplated that the present invention covers any and all modifications, variations or equivalents that fall within the scope of the basic underlying principles disclosed above and claimed herein. The above detailed description and the examples described therein have been presented for the purposes of illustration and description only and not for limitation.

What is claimed is:

1. A method carried out by a first network routing node comprising:
    storing at least a portion of a packet that is destined for a destination network node, the portion of the packet having a virtual channel (VC) identifier associated therewith;
    incrementing the virtual channel identifier by one, the VC identifier associated with the portion of the packet to produce an incremented destination VC identifier;
    determining that a destination virtual channel buffer corresponding to the incremented destination VC identifier in the destination network node is available to store the at least portion of a packet; and
    in response to determining that the destination virtual channel buffer corresponding to the incremented destination VC identifier in the destination network node is available to store the at portion of the packet,
    sending the portion of the packet and the incremented destination VC identifier to the destination network node.

2. The method of claim 1 wherein determining that the destination virtual channel buffer in the destination network node is available to receive the portion of the packet further comprises receiving notification data from the destination network node that the destination virtual channel buffer corresponding to the incremented destination VC identifier in the destination network node is available to store the portion of the packet.

3. The method of claim 2 further comprising: receiving notification data from the destination network node that the destination virtual channel buffer corresponding to the incremented destination VC identifier in the destination network node is not available to store the portion of the packet; and waiting to send the portion of the packet and the incremented destination VC identifier to the destination network node until the destination virtual channel buffer corresponding to the incremented destination VC identifier in the destination network node is available.

4. The method of claim 1 wherein the first network node includes a plurality of directional input queues and the method further comprising performing the storing, the incrementing, the determining and the sending for each directional input queue of the first network routing node.

5. A network routing node comprising:
    logic operative to: store at least a portion of a packet that is destined for a destination network node, the portion of the packet having a virtual channel (VC) identifier associated therewith
    such that the at least portion of the packet is stored in one of the plurality of restricted channel buffers based on the virtual channel identifier;
    increment the VC identifier associated with the portion of the packet by one to produce an incremented destination VC identifier;
    determine that a destination virtual channel buffer corresponding to the incremented destination VC identifier in the destination network node is available to store the portion of the packet; and
    in response to the determination, send the portion of the packet and the incremented destination VC identifier to the destination network node.

6. The network routing node of claim 5 comprising logic operative to: determine that a destination virtual channel buffer corresponding to the incremented destination VC identifier in the destination network node is available to store the portion of the packet in response to receiving notification data from the destination network node that the destination virtual channel buffer corresponding to the incremented destination VC identifier in the destination network node is available to store the portion of the packet.

7. The network routing node of claim 5 wherein the logic is operative to receive notification data from the destination network node that the destination virtual channel buffer corresponding to the incremented destination VC identifier in the destination network node is not available to store the portion of the packet; and operative to wait to send the portion of the packet and the incremented destination VC identifier to the destination node until the destination virtual channel buffer corresponding to the incremented destination VC identifier in the destination network node is available.

8. The network routing node of claim 5 wherein the logic comprises a plurality of directional input queues and wherein the logic is operative to perform the storing, the incrementing, the determining and the sending for each directional input queue of the network routing node.

9. The method of claim 1 wherein the incremented destination VC identifier indicates a flit hop level and wherein the storing comprises storing incoming flits in at least one of a plurality of virtual channel buffers wherein each of the plurality of virtual channel buffers is restricted to store a same hop count of flits that are being received.

10. The apparatus of claim 5 wherein the incremented destination VC identifier indicates a flit hop level.

11. The apparatus of claim 10 wherein the logic comprises a plurality of directional input queues each comprising a plurality of virtual channel buffers wherein each of the plurality of virtual channel buffers is restricted to store a same hop count of flits that are being received.

* * * * *